Patented May 19, 1942

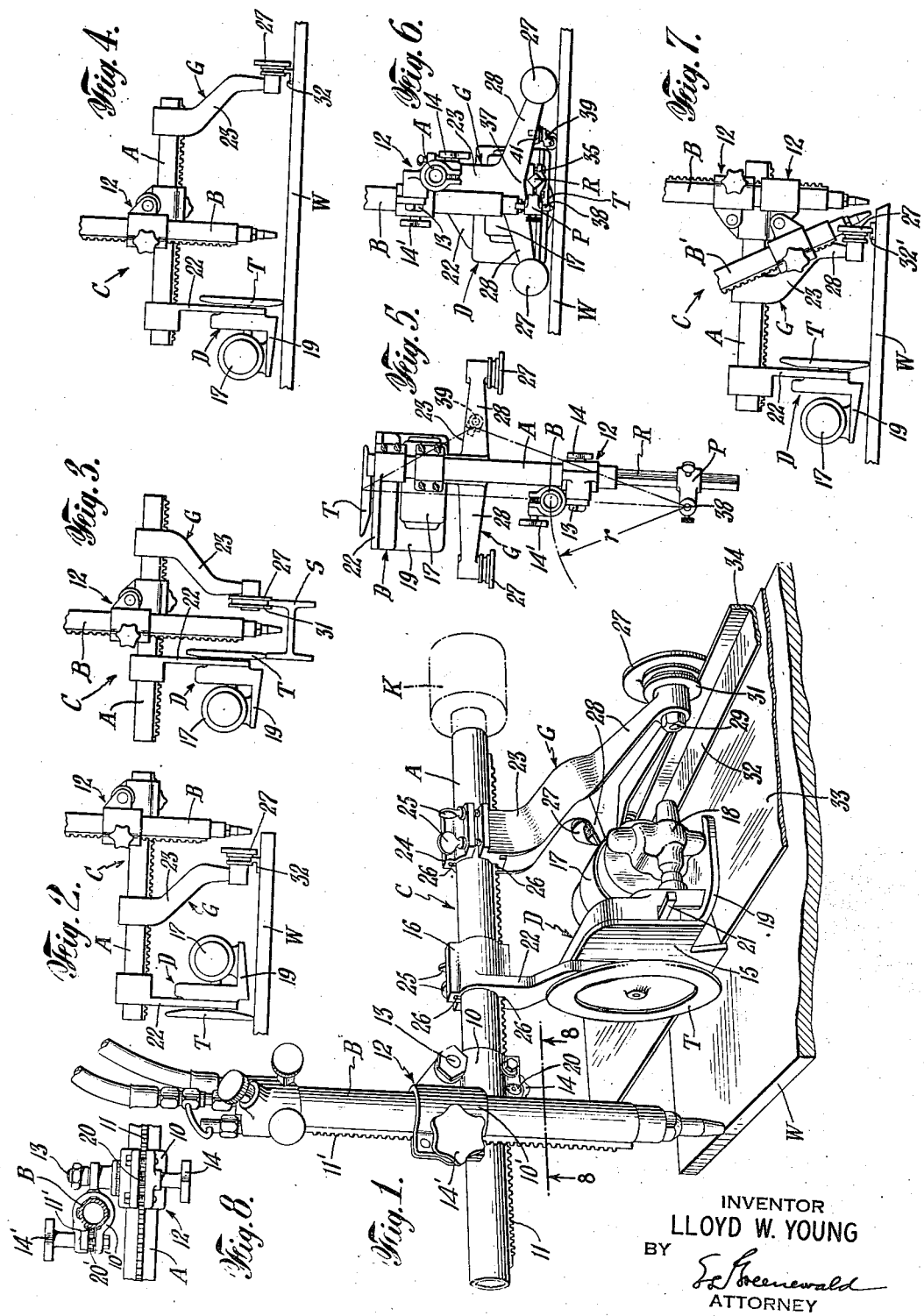

2,283,347

UNITED STATES PATENT OFFICE 2,283,347

PORTABLE TOOL CARRIAGE

Lloyd W. Young, Scotch Plains, N. J., assignor to Oxweld Acetylene Company, a corporation of West Virginia Application March 22, 1941, Serial No. 384,665

16 Claims. (Cl. 266—23)

This invention relates to a carriage for supporting tools for movement over a work surface, and more particularly to a relatively small and light-weight portable machine capable of propelling one or more blowpipes along a path to perform flame-cutting, welding, localized heat-treating, and other similar operations.

The principal objects of the present invention are to provide a light-weight portable tool carriage of improved and simplified construction; to provide a portable tool carriage composed of a plurality of supporting units which may be assembled in any one of several different ways; to provide a portable blowpipe apparatus having wheeled supporting and driving members that may be spaced different distances apart; to provide a carriage having a tool- mounting arm, and having supporting members that may be interchangeably and reversibly mounted on the arm; to provide a wheel blowpipe-supporting carriage that may be easily adjusted to any one of a wide range of widths of wheel-base; and to provide an improved blowpipe carriage having a radius rod attachment for guiding the blowpipe carriage about circular paths. These and other objects and advantages will become apparent from the following description and from the accompanying drawing which discloses several closely related forms of the apparatus embodying principles of the present invention. Identical reference characters will be used throughout the several views in designating corresponding parts.

Referring to the drawing:

Fig. 1 is a perspective view of one form of blowpipe apparatus embodying the invention;

Figs. 2, 3, 4, and 7, are diagrammatic views of a blowpipe apparatus of the type shown in Fig. 1, indicating various arrangements that may be made with the apparatus;

Figs. 5 and 6 are respectively top plan and side elevational views of a similar apparatus, incorporating a radius rod attachment; and Fig. 8 is a sectional view taken on the line 8—8 of Fig. 1, showing details of the blowpipe bracket.

Generally speaking, the invention comprises a carriage C adapted to support a tool, such as a flame-cutting or welding blowpipe B, for movement over the horizontal surface of a workpiece such as a steel plate W. The carriage C comprises two wheeled members or supporting units D and G, joined by a cross arm or connecting member A, which also serves to mount the tool B. The supporting units together are provided with at least three wheels for maintaining the carriage in stable operative relation to the work surface. The carriage C may be propelled manually but preferably is self-propelled, in which latter case one of the supporting units comprises a driving or propelling unit D having a motor-driven traction wheel T. The other supporting unit comprises an idling or guiding unit G having at least one idler or guide wheel adapted to roll over the work surface. The tool-mounting bracket and both supporting units are independently mountable on the cross arm A to provide extreme flexibility in the arrangement of the parts relative to one another. Because of the ease with which the supporting units and the blowpipe holder may be mounted on and demounted from the arm A, the carriage in a few moments may be assembled for use, or disassembled for carrying or shipping the parts compactly.

As will be apparent from the arrangements shown in Figs. 2, 3, 4, and 7, the units D and G are independently adjustable along the connecting member A and may be secured to the latter in any one of a number of positions, at desired distances apart; and both units may also be removed from the arm A, and then replaced and secured thereon in reversed position to change the spacing between the units, thus providing stability and a wide choice of wheel-base widths for the carriage, and a wide range of positions for the tool carried thereby.

The driving unit D comprises a support 15 having a clamping sleeve 16 at its upper end for receiving the arm A. The traction wheel T is journalled preferably about a generally horizontal axis at the lower or base portion of the support 15 for rolling engagment with the surface of the workpiece W. Preferably the traction wheel axis is below and parallel with the axis of the arm A. As shown, an electric motor 17 and enclosed transmission mechanism 18 are supported on a shelf or platform 19 rigidly extending from one side of the support 15 adjacent to the traction wheel T. A clutch lever 21, projecting from the enclosed transmission, controls the engagement and disengagement of the transmission gearing with the traction wheel T. The traction wheel T and the driving connection extending from the motor may be of the type more fully disclosed in my Patent 2,148,666 dated February 28, 1939. The support 15, which connects the traction mechanism with the arm A, comprises a connecting plate 22 which may extend from the sleeve 16 downwardly and laterally from the arm A to offset the traction wheel T from the arm A, as indicated in Figs. 1 and 5.

The guiding or idling unit G comprises a supporting bracket 23 or similar member adjustable along the arm A and secured thereto by a clamping sleeve 24, similar to the sleeve 16. Clamping screws 25, when loosened, permit both sleeves 16 and 24 to slide freely along the arm, and when tightened secure the sleeves in any selected position. Each of the sleeves 16 and 24 is provided with opposed longitudinal slots 26, to accommodate the rack 11 when the arm A is located with the rack either on the top or bottom of the arm. By locating the rack 11 on top of the arm, the blowpipe holder 12 may be positioned 180° about the arm A from the position shown in Fig. 1, to locate the blowpipe on the far side of the arm A.

The bracket 23 preferably comprises a channel-shaped or otherwise reenforced rib which extends downwardly from the sleeve 24 while sloping in the direction of the length of the arm A so that the lower portion is offset from the upper portion, as indicated in Fig. 1. At its lower end the bracket 23 has a pair of spaced legs 28 to each of which an idler wheel 27 is journalled about a horizontal axis. Where the carriage is used to guide the tool in a straight path and no shifting of the idler wheels is desired, the idler wheel axes preferably are parallel with the traction wheel axis, and with the axis of the arm A. When the unit G is located directly adjacent to the unit D, so that the sleeve 16 and 24 adjoin, the sloping bracket 23 extends over the motor 17. The offset part of the bracket 23 permits increasing and decreasing the distance of separation between the wheels of the respective supporting units, simply by reversing the sleeve 24 on the arm A, as will more fully appear.

The idler wheels 27 may be of any desired construction such that they may engage the surface of the workpiece W in cooperation with the traction wheel T to propel the carriage C in a direction transversely of the arm A. Preferably each of the legs 28 is provided with a horizontal spindle 29 to which the wheels 27 are journalled. The wheels also preferably are provided with a concentric annular flange 31 which may be grooved to receive an upstanding track member 32. The track member, as shown in Fig. 1, may comprise an angle iron having a generally horizontal base plate 33 and a vertical flange 34 extending upwardly a sufficient distance as to hold the outer periphery of the idler wheels 27 out of engagement with the surface of the workpiece W. Where the wheels 27 are intended to roll directly on an upturned edge of the work, for example, on the flange of a channel or I-beam S (Fig. 3), the annular flange 31 may approximate more nearly in diameter the outer periphery of the wheel 27, as shown, if a smaller diameter flange 31 would cause objectionable tilting of the carriage. Even in the latter event, however, a vertical cut may be made by restoring the blowpipe B to a vertical position by means of the pivoted clamp, as will appear.

As best shown in Fig. 1, the connecting member or cross arm A comprises a metal tube or bar, preferably of uniform cross section throughout its entire length. The arm A desirably comprises a normally horizontally-positioned cylindrical tube of a diameter equal to that of a conventional cutting blowpipe B; or the blowpipe itself may be substituted for the arm A to hold the units in operative relation while the blowpipe performs its usual function of projecting heating or oxidizing agents, for example, while operating along a vertical surface.

The arm A supports a tool, such as a conventional flame-cutting or welding blowpipe B, in operative relation to the surface of the workpiece W, as by a tool holder 12 secured both to the blowpipe or tool and to the arm A. The holder 12 may comprise a supporting clamp including a pair of sleeves 10, 10' pivotally connected to one another. The sleeve 10' may be clamped around the cylindrical body of the blowpipe, and the sleeve 10 may be clamped about the arm A. A pivot 13 permits the blowpipe to be adjusted in a vertical plane spaced transversely from the arm A.

The sleeves 10, 10' are provided with operating handles 14, 14' adapted to rotate pinions 20, 20' journaled between spaced flanges of the respective sleeves of the holder 12, as shown in Fig. 8. A rack 11, bolted or otherwise secured along the arm A, serves as a spline to assist in aligning the units D and G in proper relation on the arm. The rack 11 also meshes with the pinion 20, so that as the operator rotates the handle 14, the holder 12 and blowpipe B are moved along the arm A to any desired position. A similar rack 11' is secured along the body of the blowpipe B for cooperation with pinion 20', so that as handle 14' is rotated, the blowpipe is raised or lowered for proper positioning relative to the workpiece W. Clamping screws may extend between the flanges of each sleeve 10, 10' to lock the sleeves in the desired positions on the arm and blowpipe respectively, in the manner of screws 25. A counter weight K, or another blowpipe, optionally may be attached to one end of the arm A, whenever required to counterbalance the weight of the blowpipe means mounted at the other end of said arm, as shown in Fig. 1.

Various examples of the manner in which the supporting units G and D, and the blowpipe B may be mounted with respect to one another on the arm A are shown diagrammatically in Figs. 2, 3, 4, and 7. In Fig. 2 the supporting units are located in what might be termed the normal position, that is, the position in which wide separation distance between the wheels of the respective units is obtained with the units secured relatively closely together on the arm A, thereby providing a rigid support. In Fig. 2 the blowpipe has been shifted to the end of the arm A opposite from that indicated in Fig. 1. Hence, for one setting of the track member 32, both sides of a wide plate member may be cut parallel to one another during a forward and return pass of the machine over the plate simply by shifting the blowpipe to the opposite side of the arm for the return pass.

In the arrangement shown in Fig. 3, both units have been reversed on the arm A to provide maximum clearance for the accommodation of the blowpipe B between the units for a given small separation distance between the traction wheel T and the wheels 27. The arrangement shown in Fig. 3 is particularly adapted for beam and rail slitting, as where the web of a structural member S is to be severed longitudinally.

In Fig. 4 the units G and D have been separated substantially to provide greater wheel separation and a greater space for movement of the blowpipe B along the arm A. Accordingly, by combining the longitudinal motion imparted by the traction wheel and motion along the arm imparted manually by the pinion mechanism 14, the apparatus may be employed in cutting irregular shapes, the blowpipe course being indicated directly on the surface of the work plate W.

The arrangement disclosed in Fig. 7 is substantially identical with that shown in Fig. 2 except that two blowpipes B and B', for example, may be used to perform a cutting and beveling operation concurrently. A modified type of track member 32' consisting of a relatively flat strip may be employed, so that the track, and accordingly the motion of both blowpipes, may follow more closely undulations in the work plate W. A pair of blowpipe holders 12 are employed, the first extending between the arm A and the blowpipe B, and the second extending between the blowpipes B and B'. Since the arm A is of the same diameter as the blowpipes B and B', the respective sleeves forming the holders 12 may be used interchangeably to engage either the arm A or the blowpipes B, B'.

Figs. 5 and 6 disclose a machine of the type shown in Fig. 1 provided with a circle cutting attachment. Use may be made of a radius rod R detachably connected to and extending horizontally from one of the supporting units, for example, the unit G. As shown in Fig. 6, the rod R may extend from a clamp or mounting plate 35 located at the crotch 37 formed by the legs 28, which clamp may be employed to hold one end of the rod R detachably in operating position directly beneath the arm A. A pivot P is adjustably slidable along the rod R and is provided with a pointed pin 38 spaced transversely from the rod R. Clamping screws of a conventional type are employed to hold the pivot P and the pin 38 in normal operating positions. Preferably, the blowpipe holder 12 and the traction wheel T are so located that the blowpipe B swings about pivot 13 in a vertical plane containing the axis of the traction wheel T. Additionally, the pin 38 may be located in the same plane, so that when the machine is employed for following circular paths, both the blowpipe and the point of engagement of the traction wheel are located in the same radial line, as indicated in Fig. 5.

A caster 39 may be employed detachably to support the bracket 23 with the wheels 27 free of the work plate W. As shown in Figs. 5 and 6, the caster may be mounted in a socket 41 formed in one of the legs 28 at a point spaced from the vertical plane containing the blowpipe B and the traction wheel axis. The carriage then is supported for circular travel at the apices of a triangle formed by the pin 38 and the respective points of engagement of the caster 39 and traction wheel T with the surface of the work plate W. The caster 39 may swivel within the socket 41 as the caster naturally swings until the axis points toward the pin 38 as the carriage follows a circular path.

It will be evident that the improved carriage herein disclosed may be used to propel tools other than blowpipes; that the three main units of the carriage may be assembled in various ways to conform with different operating requirements; and that numerous structural details of these units may be modified, all without departing from the principles of this invention or sacrificing its advantages.

I claim:

1. A carriage for supporting, propelling and guiding a tool (e. g., a blowpipe) relatively to a workpiece, such carriage comprising, in combination, a supporting and propelling unit including a traction wheel and mechanism for rotating said wheel; a supporting and guiding unit including at least one wheel for guiding the carriage along a desired path; and a connecting member secured to both such units and holding them spaced apart, said member and said units being so constructed and arranged that each unit is adjustable along, and removable from and replaceable on said member independently of the other unit, and each unit may be rigidly secured to said member in any one of a number of positions along said member, whereby the distance between said units may be varied.

2. Material-working apparatus, comprising a carriage for supporting, propelling and guiding a tool (e .g., a blowpipe) relatively to a workpiece, such carriage comprising, in combination, a supporting and propelling unit including a traction wheel and mechanism for rotating said wheel; a supporting and guiding unit including at least one wheel for guiding the carriage along a desired path; a tool-supporting member connected to both of such units and holding them spaced apart, said member and said units being so constructed and arranged that each unit is adjustable along, and removable from and replaceable on said member independently of the other unit, and each unit may be rigidly secured to said member in any one of a number of positions along said member, whereby the distance between said units may be varied; a tool; and a holder for said tool adjustable along said member and rigidly securable thereto at any desired point on said member at either side of each of said units.

3. Material-working apparatus as claimed in claim 2, in which said tool-supporting member has a rack secured to and extending lengthwise thereof; each of said units has a recessed portion, to receive spaced portions of said rack and thereby align said units; and said holder carries means adapted to cooperate with said rack to adjust said holder lengthwise of said tool-supporting member.

4. Tool-propelling apparatus movable over a substantially horizontal work surface, comprising a cross arm; means adjustably movable relative to said cross arm for holding a tool in operative relation to said surface; and separate supporting units depending from said arm and individually movable to any desired position along the length of said arm, said units comprising a driving unit having a motor-driven traction wheel engageable with said surface, and an idling unit comprising a plurality of spaced idler wheels engageable with said surface.

5. A carriage adapted to support a tool such as a blowpipe for movement over the surface of a workpiece, said carriage comprising an arm; a plurality of wheeled supports for said arm adapted to roll on said workpiece, said supports being slidable on either end of said arm for positioning along said arm; means for securing said respective wheeled supports in adjustable spaced relation on said arm; and a tool holder adjustably slidable along said arm.

6. A carriage adapted to support a tool for movement over a workpiece, said carriage comprising a support; a wheel journalled to said support for rolling engagement with said workpiece; a bracket having a pair of spaced legs; wheels journalled to said respective legs for rolling engagement with said workpiece; a single tubular cross arm connecting said support and said bracket in adjustably spaced relation; and a tool holder adjustably mounted on said cross arm.

7. A carriage adapted to support a blowpipe or similar tool for movement over a workpiece, said carriage comprising three quickly detachable units; the first unit comprising a support and a traction wheel journalled about a horizontal axis to the lower portion of said support; the second unit comprising a bracket having a pair of spaced legs and idler wheels journalled to the lower ends of said respective legs about axes parallel with said first-mentioned axis; and said third unit comprising a cross arm above and parallel with all of said axes and connecting said support and said bracket in adjustable spaced relation; and a blowpipe holder mounted on said carriage.

8. Apparatus adapted to propel a blowpipe or similar tool over a workpiece, said apparatus comprising a support; a traction wheel journalled about a generally horizontal axis to the lower portion of said support for rolling engagement with said workpiece; a motor mounted on said support and adapted to rotate said traction wheel; a bracket having a pair of depending legs; idler wheels journalled to the lower end of said respective legs about axes parallel with said horizontal axis; a horizontal cross arm; means on said bracket and said support for slidably connecting said bracket and said support on said cross arm; and a tool holder adjustably mounted on said cross arm.

9. Blowpipe apparatus adapted to propel a blowpipe or similar tool over the horizontal surface of a workpiece, said apparatus comprising a support; a traction wheel journalled to said support about a generally horizontal axis; a motor mounted on said support and adapted to rotate said traction wheel; a cross arm comprising a rod extending above and generally parallel with said axis; said support including a clamping sleeve slidable on said arm for securing said support adjustably along said arm; a bracket having a clamping sleeve slidable on said arm for securing said bracket adjustably along said arm, said bracket being provided with a pair of spaced idler wheels adapted to engage said surface about axes parallel with said traction-wheel axis; and a blowpipe-supporting clamp slidable along said arm.

10. Blowpipe apparatus as claimed in claim 9 wherein said blowpipe-supporting clamp comprises a pair of mounting sleeves pivotally connected to one another, one of said mounting sleeves normally engaging the cylindrical body of a blowpipe and the other of said mounting sleeves normally engaging said arm; and wherein said rod forming said cross-arm is cylindrical and of the same diameter as said blowpipe body, whereby said sleeves may be interchanged.

11. Blowpipe apparatus as claimed in claim 9 including a rack extending along said arm; and pinion mechanism on said clamp to cooperate with said rack for moving said clamp along said arm; and wherein said clamp, and clamping sleeves are provided with grooves accommodating said rack, to assist in aligning said support, said bracket, and said blowpipe clamp in operative relation on said arm.

12. A carriage adapted to support a blowpipe or similar tool for motion over a horizontal work surface, comprising a cross arm; a pair of members depending from and slidably adjustable along said cross arm; wheels journalled to the bottom portions of said respective members about axes substantially parallel with said cross arm for supporting said cross arm substantially horizontally above said surface; a tool-support slidably adjustable along said cross arm; at least one of said members being offset in the direction of the length of said cross arm, said offset member being reversibly mountable on said cross arm to provide increased and decreased distance of separation between the wheels of the respective members for each spacing of said members on said cross arm.

13. Blowpipe apparatus adapted to propel a blowpipe or similar tool over a metal workpiece, said apparatus comprising a cross arm; a support depending from and slidably adjustable along said cross arm; a traction wheel journalled to the base of said support for engagement with said workpiece; a traction-wheel motor mounted on one side of said support adjacent to said traction wheel; a member depending from and slidably adjustable along said cross arm, and having a base portion offset from the upper portion in the direction of the length of said arm whereby said member may extend over said motor when said member is adjacent to said support; at least one wheel journalled to the base of said member for rolling engagement with said workpiece; and a blowpipe-supporting clamp slidable on said cross arm.

14. Blowpipe apparatus adapted to propel a blowpipe over the surface of a metal piece, comprising a tubular cross arm of uniform cross section throughout its length; a blowpipe clamp adapted to support a blowpipe in operative relation to said surface, said clamp being slidable along said tubular cross arm; a pair of supporting members each reversible on and slidable along said tubular cross arm for positioning at any desired point along the length of said cross arm, said members depending from said cross arm and having wheels journalled to the lower portions thereof about axes substantially parallel with said cross arm for rolling engagement with said surface, the lower portion of at least one of said members being offset from the upper portion thereof in the direction of the length of said cross arm, and one of said members comprising a horizontal platform at its lower portion; and a motor mounted on said platform for driving one of said wheels, said offset member being adapted to extend over said motor when said members are located close together.

15. Blowpipe apparatus adapted to support a blowpipe or similar tool for movement over the generally horizontal surface of a workpiece, said apparatus comprising wheeled supporting means including a support, a traction wheel journalled to said support for engagement with said surface, a supporting bracket, and guide wheels journalled to said bracket for engagement with said surface; a cross arm; said bracket and said support being independently slidable along and securable to said cross arm in adjustable spaced relation; a blowpipe holder mounted on said cross arm; and a radius rod detachably connected to and extending horizontally from said supporting means, said radius rod including a pivot pin adjustably positioned along said radius rod.

16. Blowpipe apparatus as claimed in claim 15 wherein said pin and said blowpipe are aligned in a vertical plane containing the axis of said traction wheel and said bracket is provided at a point spaced from said vertical plane with a caster mount, said mount being adapted to secure a caster in position to swivel about a vertical axis and to engage said surface while holding said guide wheels out of engagement with said surface.

LLOYD W. YOUNG.